(12) United States Patent
Schindler et al.

(10) Patent No.: US 7,712,846 B2
(45) Date of Patent: *May 11, 2010

(54) SNOWMOBILE DRIVE TRACK

(75) Inventors: Kevin Schindler, Red Lake Falls, MN (US); Andrew Beavis, Goodridge, MN (US); Bret Rasmussen, Preston, ID (US); Jason Howell, Helena, MT (US)

(73) Assignee: Arctic Cat Inc., Thief River Falls, MN (US)

( * ) Notice: Subject to any disclaimer, the term of this patent is extended or adjusted under 35 U.S.C. 154(b) by 210 days.

This patent is subject to a terminal disclaimer.

(21) Appl. No.: 11/840,093

(22) Filed: Aug. 16, 2007

(65) Prior Publication Data

US 2008/0007119 A1    Jan. 10, 2008

Related U.S. Application Data

(63) Continuation-in-part of application No. 10/786,583, filed on Feb. 23, 2004, now Pat. No. 7,422,295.

(60) Provisional application No. 60/449,792, filed on Feb. 24, 2003.

(51) Int. Cl.
B62D 55/24    (2006.01)

(52) U.S. Cl. .................................... 305/178; 305/165

(58) Field of Classification Search ................ 305/157, 305/158, 160, 165, 178, 179, 180, 181, 182; 440/12.56, 12.63, 12.64; 180/9.1
See application file for complete search history.

(56) References Cited

U.S. PATENT DOCUMENTS

| | | | |
|---|---|---|---|
| 2,680,421 A | 6/1954 | Baker | |
| 2,705,470 A | 4/1955 | Baker et al. | |
| 3,155,436 A | 11/1964 | Bonmartini | |
| 3,278,244 A | 10/1966 | Deffenbaugh et al. | |
| 3,477,768 A | 11/1969 | Culver | |
| 3,762,779 A * | 10/1973 | Russ, Sr. ..................... | 305/178 |
| 3,785,420 A | 1/1974 | Bradley et al. | |
| 3,830,551 A | 8/1974 | Masaoka et al. | |
| 3,934,944 A | 1/1976 | Forsgren | |
| 4,095,849 A | 6/1978 | Husted | |
| 4,175,627 A | 11/1979 | Husted | |
| 4,482,193 A | 11/1984 | Boggs et al. | |
| 4,795,221 A | 1/1989 | Simmons | |
| 4,938,546 A | 7/1990 | Simmons | |
| 4,953,921 A | 9/1990 | Burns | |
| 5,033,801 A | 7/1991 | Beeley | |
| 5,730,510 A | 3/1998 | Courtemanche | |
| 5,980,001 A | 11/1999 | Rubel | |

(Continued)

FOREIGN PATENT DOCUMENTS

GB    1590358    6/1981

Primary Examiner—Russell D Stormer
(74) Attorney, Agent, or Firm—Black Lowe & Graham PLLC

(57) ABSTRACT

An endless drive track for a snowmobile is provided with traction lugs that are inclined relative to normal to the track base. When the traction lugs are inclined away from the direction of travel for the track, the traction lugs can compress the snow before engaging the snow for traction, thereby providing lift for a snowmobile traveling in deep snow. Second traction lugs, angled opposite the first, provide hard snow traction and long traction life.

7 Claims, 13 Drawing Sheets

U.S. PATENT DOCUMENTS

| | | |
|---|---|---|
| 6,065,818 A | 5/2000 | Fischer |
| 6,109,705 A * | 8/2000 | Courtemanche ............ 305/178 |
| 6,203,125 B1 | 3/2001 | Arakawa et al. |
| 6,540,310 B1 | 4/2003 | Cartwright |
| 6,609,771 B2 | 8/2003 | Morin et al. |
| 7,018,005 B2 * | 3/2006 | Lemieux ..................... 305/178 |
| 7,347,512 B2 * | 3/2008 | Dandurand ................. 305/178 |

* cited by examiner

SNOWMOBILE DRIVE TRACK

PRIORITY CLAIM

This application is a continuation-in-part of U.S. patent application Ser. No. 10/786,583 filed on Feb. 23, 2004, which claims priority to U.S. Provisional Patent Application Ser. No. 60/449,792 filed on Feb. 24, 2003.

BACKGROUND OF THE INVENTION

The present invention is directed to an endless drive track for a snowmobile. Typically, snowmobiles are driven by an endless track provided with traction lugs that engage the snow or ice over which the snowmobile travels. The traction lugs are oriented perpendicular to the base of the track.

SUMMARY OF THE INVENTION

The present invention provides an endless drive track in which the traction lugs are inclined relative to the normal to the track base. When the traction lugs are inclined away from the direction of travel of the track, the traction lugs can compress deep snow before gripping with the snow, which can provide the snowmobile with lift when traveling in deep snow. When the traction lugs are inclined in the direction of travel of the drive track, they can provide a more aggressive gripping of the surface on which the snowmobile is traveling, resulting in improved acceleration.

In one aspect of the invention, the endless drive track includes a base having an exposed surface. A first traction member extends upward from the exposed surface and further extends laterally and at least partially across a width portion of the base. Preferably, at least a portion of the first traction member is oriented at a first angle relative to a line normal to the exposed surface of the base. In addition, the track includes a second traction tower or member having a body with a first portion coupled to the base and a second portion extending therefrom. An upper segment of the second portion is oriented at a second angle, which causes the upper segment to be oriented in the same direction or in an alternate direction with respect to the first traction member.

DETAILED DESCRIPTION

Figure 1:
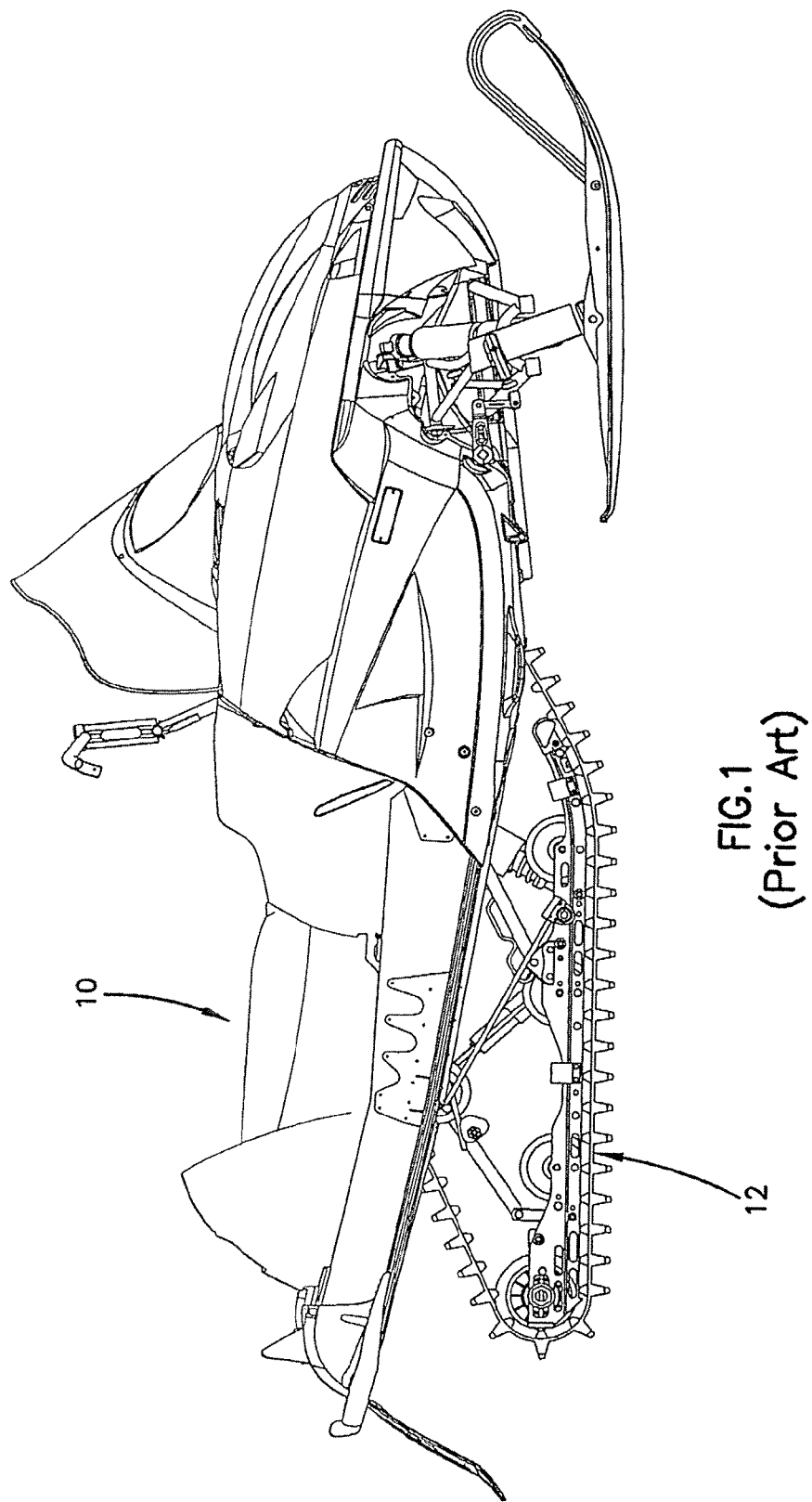
FIG. 1 is a side view of a snowmobile.

FIG. 1 shows a side view of a typical snowmobile 10. The drive system for the snowmobile includes an endless track 12, which passes around drive sprockets and idler wheels. The endless drive track 12 is provided with traction lugs that grip the surface over which the snowmobile travels. Thus, as the endless track is driven to rotate around the drive sprockets and idler wheels, the snowmobile moves forward or backward, depending on the direction of relative rotation between the drive track and the drive sprockets and idler wheels.

Figure 2:
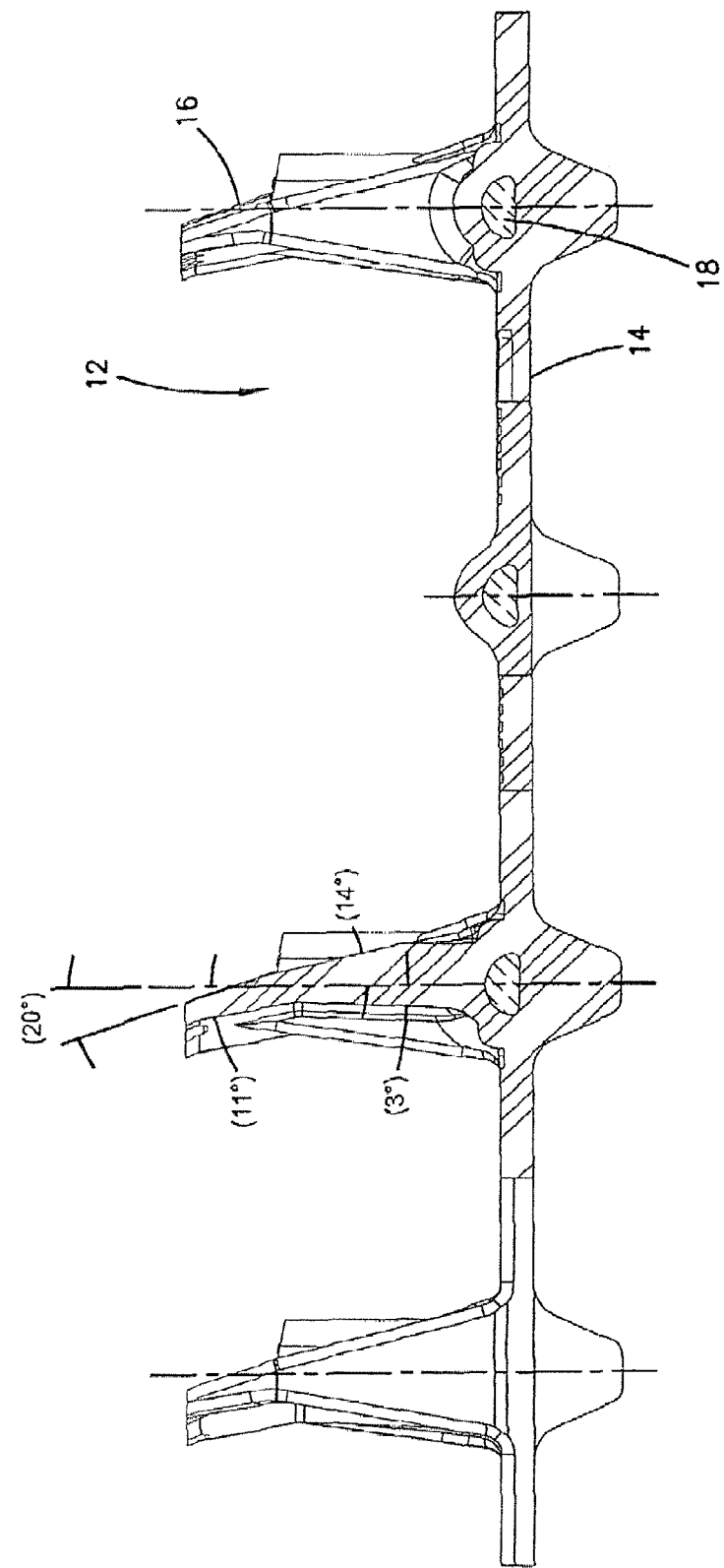
FIG. 2 is a sectional side view of a portion of an endless drive track for a snowmobile of the present invention.

Referring to FIG. 2, the endless drive track of the present invention includes a track base portion 14 and traction lugs 16. The base and traction lugs can be a unitary, molded one-piece construction. The endless drive track can be provided with a reinforcing bar 18, as is customary.

The traction lugs of the endless drive track of the present invention are inclined relative to the normal to the track base portion 14. For purposes of the present invention, the inclination of a traction lug is determined by considering a line drawn from the midpoint of the portion where the traction lug joins the track base portion to the midpoint of the tip portion of the traction lug, when viewed from the side. The term normal is referring to the geometric normal, i.e. a line extending perpendicularly from the track base when the track base is oriented in a horizontal plane. This is illustrated in FIG. 3.

Figure 3:
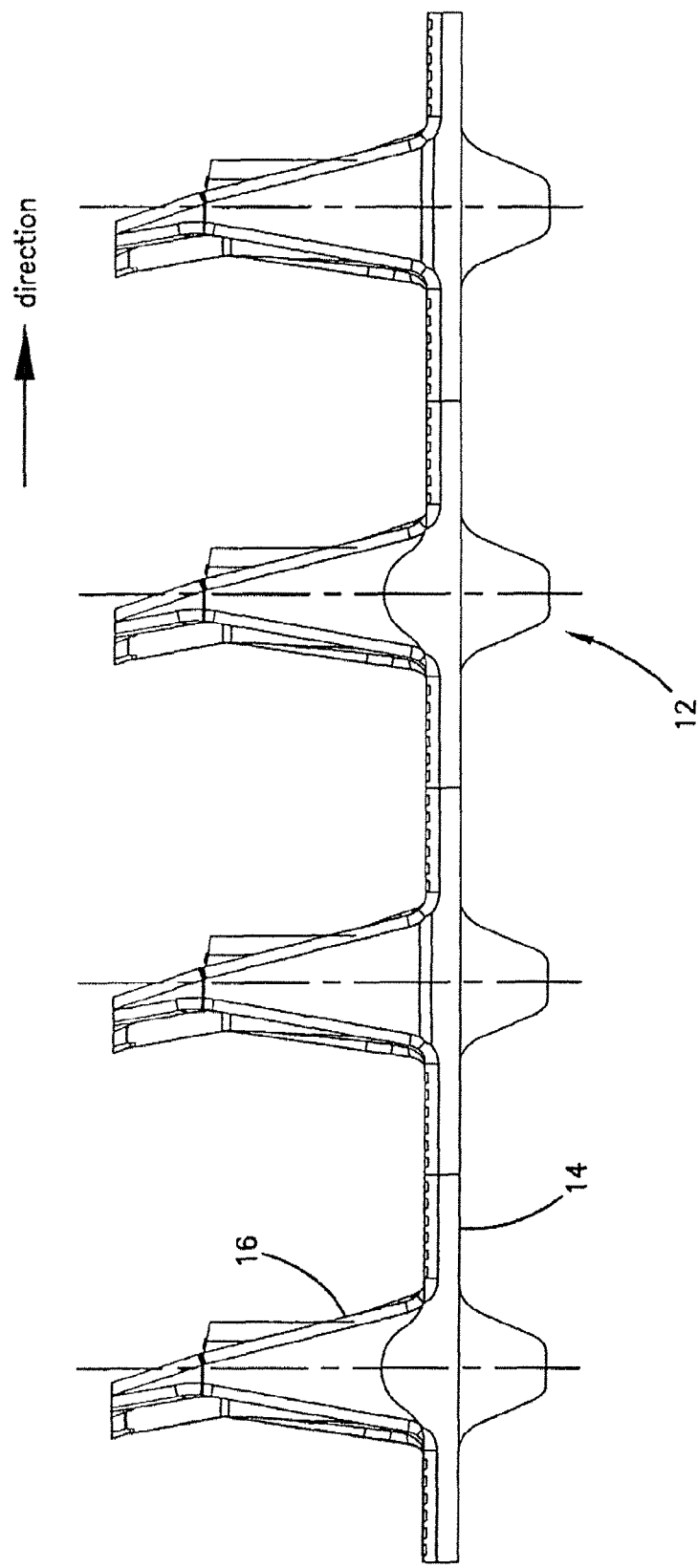
FIG. 3 is a side view of a further embodiment of a drive track for a snowmobile of the present invention.

In one aspect of the present invention, the traction lugs are inclined away from the travel direction of the endless drive track, as seen in FIG. 3. For the purposes of the present application, the direction of travel is considered the direction in which the drive track moves relative to the drive sprocket and idler wheels when a snowmobile is moving forward. Thus, for example, in FIG. 1, the direction of travel for the drive track would be in the clockwise direction.

Figure 4A:
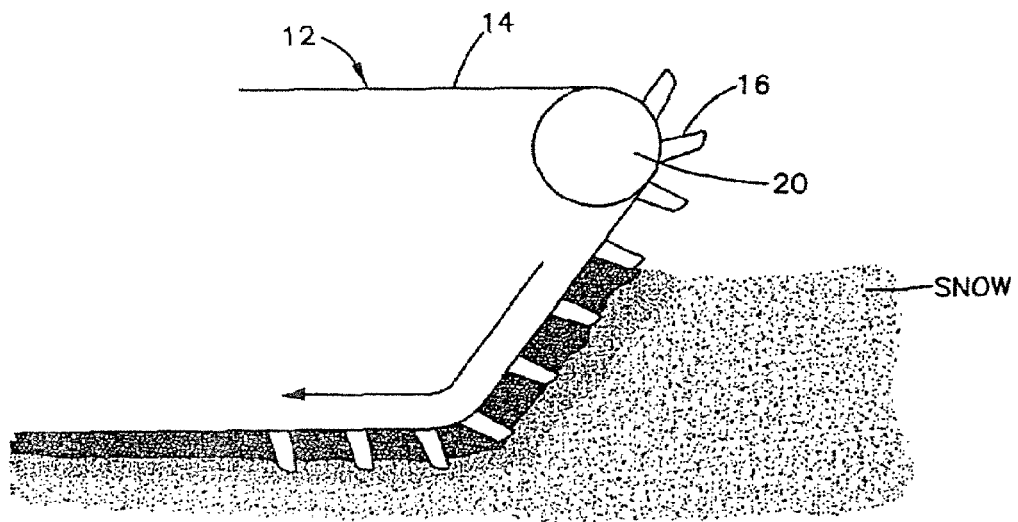
FIGS. 4A-B are side views illustrating the operation of a snowmobile with a drive track of the present invention and that of the prior art.
Figure 4B:
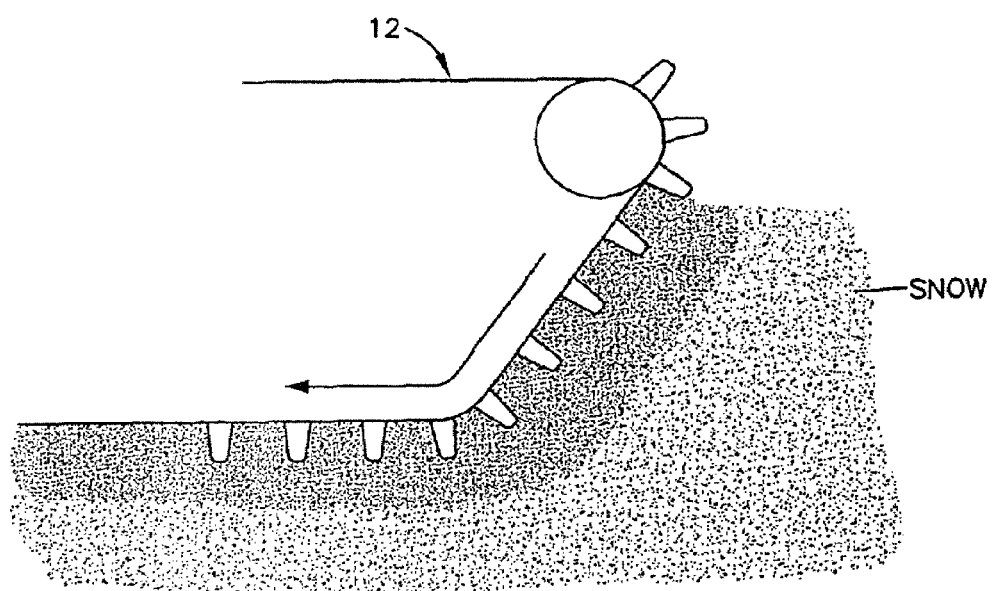

When the traction lugs are inclined away from the direction of travel for the endless track, the traction lugs may have the function of compressing snow on which the snowmobile is traveling before gripping and engaging the snow. That is, the traction lug will compress the snow as well as scoop the snow. This can be advantageous in providing the snowmobile with lift when traveling in deep snow. Referring to FIGS. 4A and B, the compression action will be described in more detail. As seen conceptually in FIG. 4A, as the drive track comes around the drive sprockets 20, the traction lugs will come into contact with the top of the snow. The inclined traction lugs of the present invention allow the snow to be pressed downwardly toward the bottom of the track. That is, the contact surface with the snow is more horizontal, improving the transport of the snow to the bottom of the track. This action tends to pack the snow down, with the track lifting itself, and thus the snowmobile, over the packed snow. The compressed snow also provides improved traction for the traction lugs. These effects are especially significant in deep snow. In contrast, the perpendicularly oriented traction lugs in FIG. 4B tend to shear the snow, causing it to crumble and disperse. Thus there is less packing of the snow, and there is more of a tendency for the traction lugs to dig out the snow, causing the snowmobile to tend to sink.

The angle of inclination of the traction lug should be sufficient to provide the compressing action, but not so great as to reduce the traction function significantly. Typically, the angle of inclination of the traction lug will be in the range of 5 to 45 degrees, preferably 5 to 30 degrees, more preferably 5 to 15 degrees. It also is possible to consider the inclination of the leading face of the traction lug. It is preferred that the upper part of the leading face of the traction lug have an inclination of at least 5 degrees, preferably at least 10 degrees, and more preferably at least 15 degrees relative to the normal to the base portion. The traction lugs generally will have a height of about 0.5 to 3 inches (1 to 8 cm), preferably about 1.5 to 3 inches (3 to 8 cm).

The leading and trailing faces of the traction lugs can be parallel or, as illustrated in FIG. 2, they can have different angles of inclination. In the example illustrated in FIG. 2, the leading face is inclined at an angle of about 15 degrees while the trailing face is inclined at an angle of about 5 degrees. Also, as illustrated in FIG. 2, the inclination of the face need not be constant over its height. For example, the angle of inclination of the face can increase toward the tip of the traction lug. The inclined face of the traction lug may have a point of inflection that is a point where the angle of inclination changes, above or below a midpoint of the height of the traction lug. There may be two or more different inclination angles on the face of the traction lug.

It is not necessary for the trailing face of the traction lug to be inclined in the same direction as the forward face. The trailing face could be oriented perpendicular to the base portion of the track, or as illustrated in FIG. 3, could be inclined at least partly in a direction opposite to the inclination of the leading face. As long as the leading face is inclined sufficiently in the direction opposite to the direction of travel, the desired effect of compressing snow can be achieved.

Figure 5:
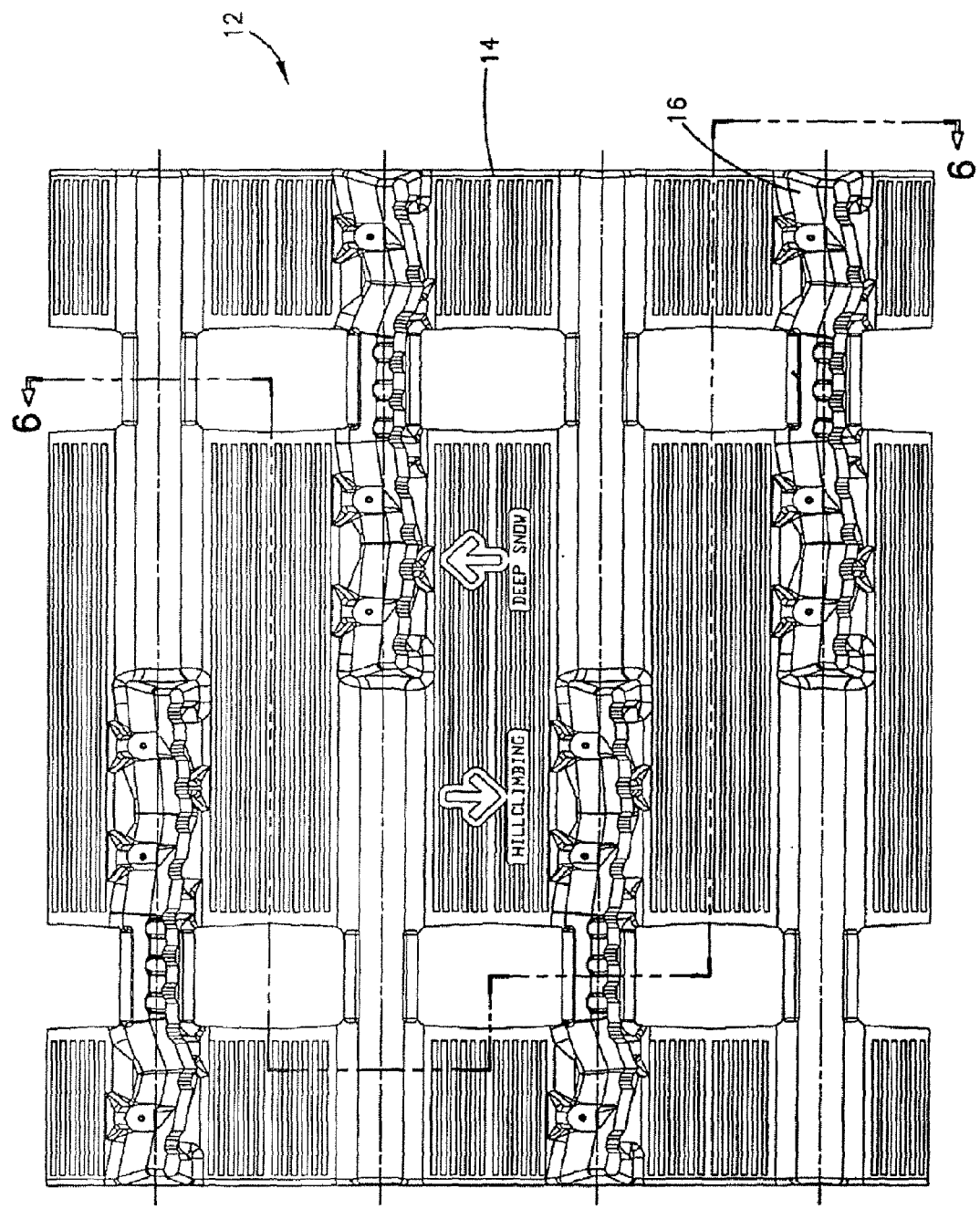
FIG. 5 is a plan view of a further embodiment of a drive track for a snowmobile of the present invention.
Figure 6:
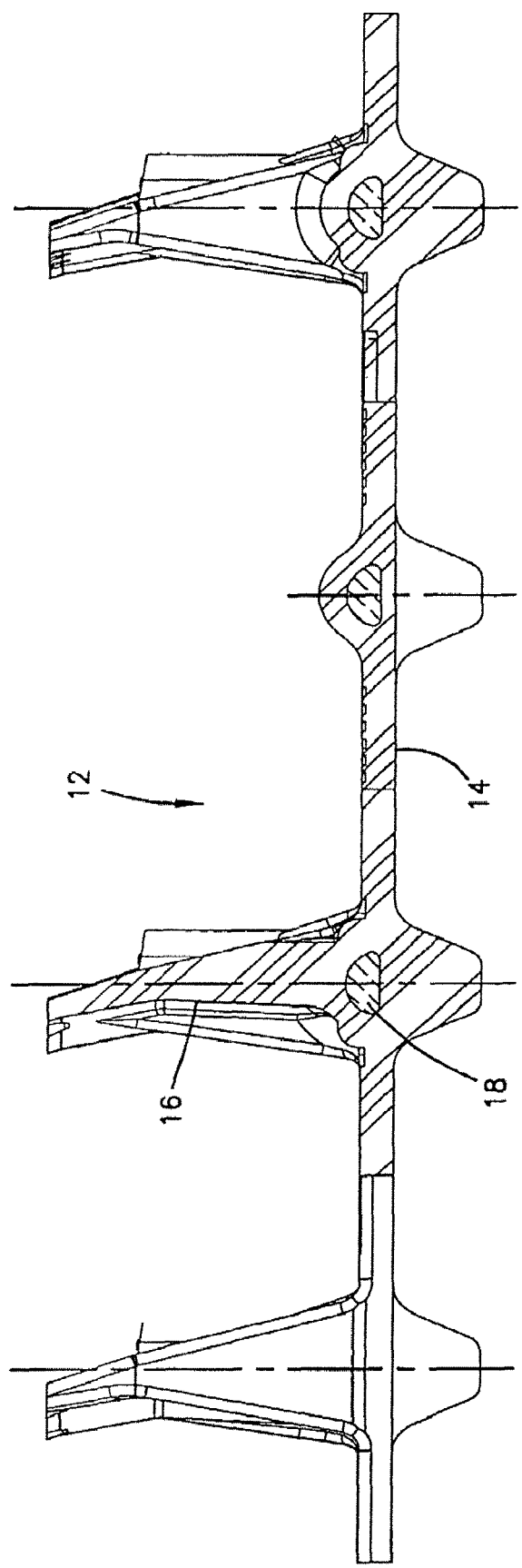
FIG. 6 is a partly sectional side view taken along line 6-6 in FIG. 5.
Figure 7:
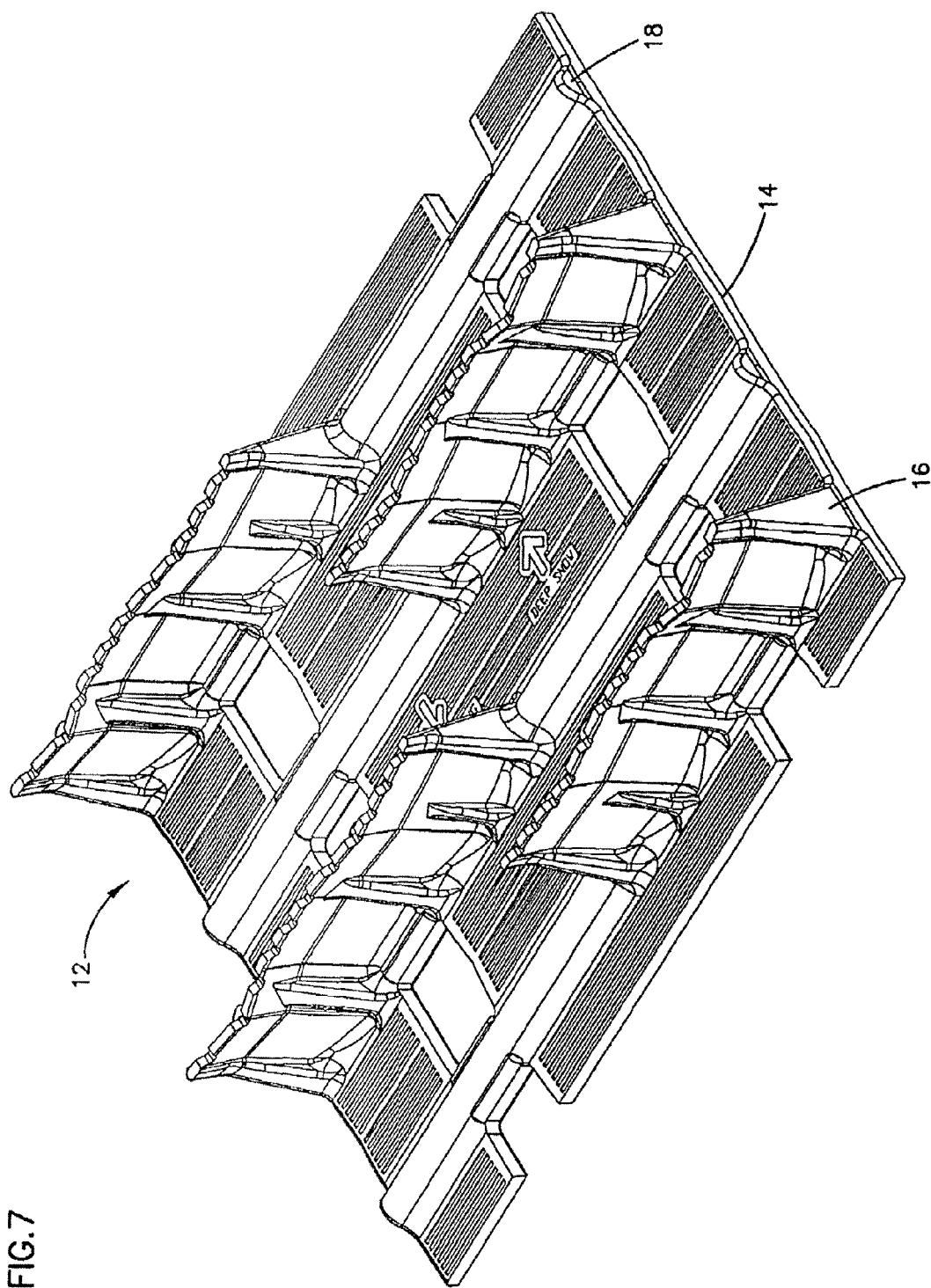
FIGS. 7 and 8 are perspective views of the drive track for a snowmobile of the embodiment of FIG. 5.
Figure 8:
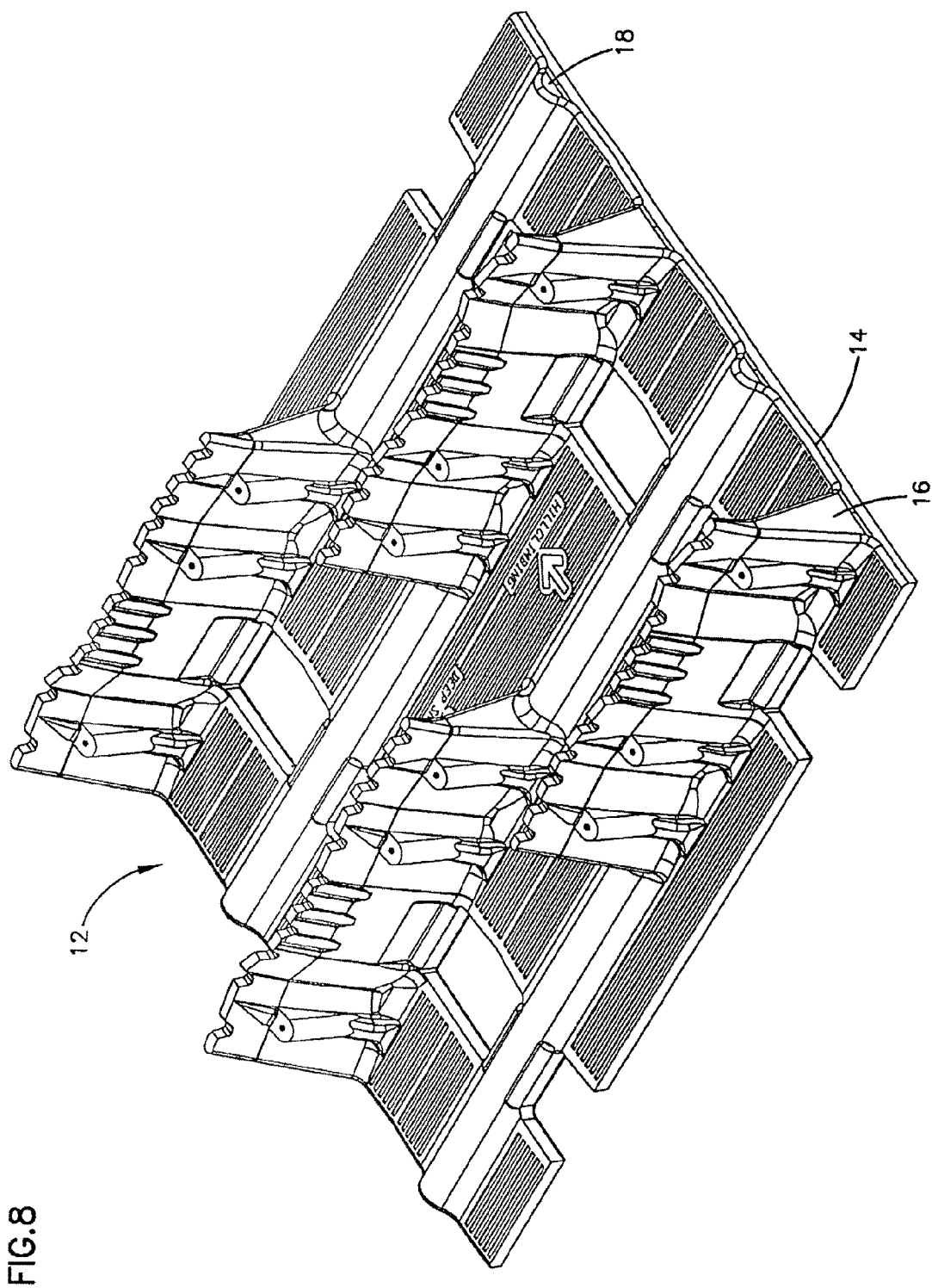
Figure 9:
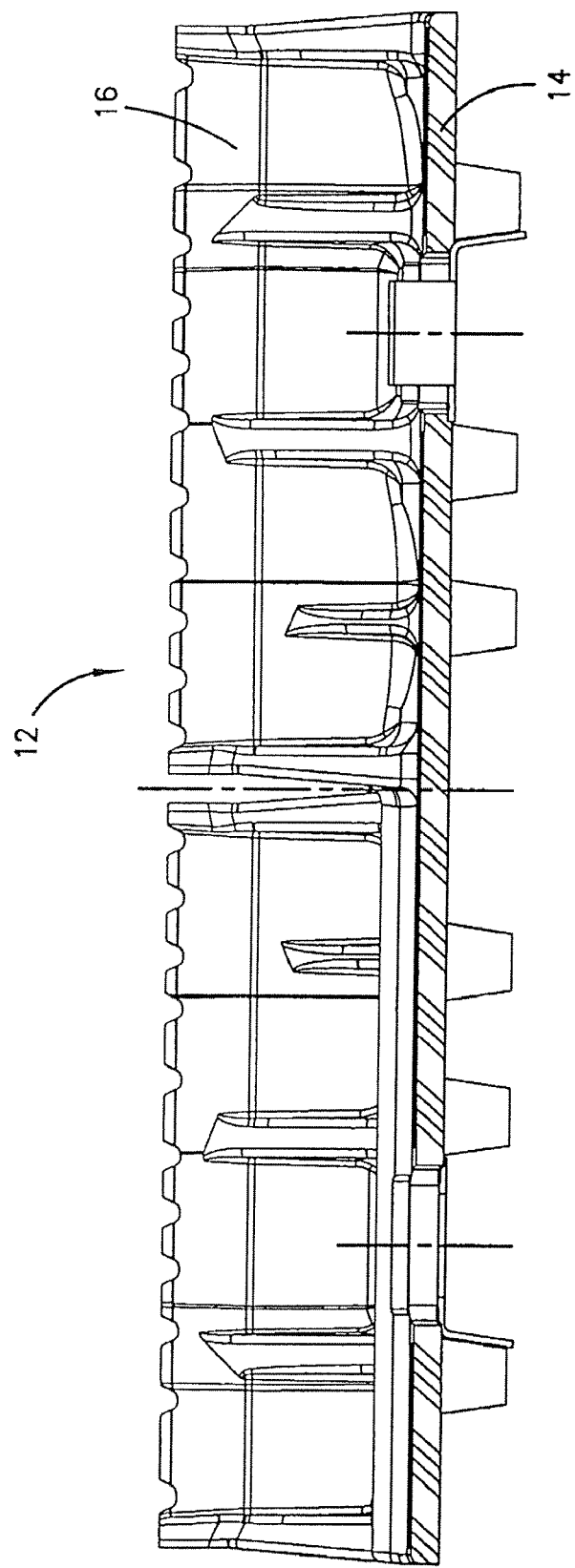
FIG. 9 is a sectional lateral view of the drive track for a snowmobile of the embodiment of FIG. 5.

Referring to FIGS. 5-9, it can be seen that the traction lugs can be provided in a staggered relationship on the track. The upper edge of the tip of the traction lug can be provided with indented portions, e.g. scallop-like cutouts. The traction lugs can be formed to extend in a straight line across the track. Alternatively, as seen in FIGS. 5, 7 and 8, the traction lugs can be formed into a shape with undulations instead of a straight line.

In another aspect of the present invention, the traction lugs are inclined toward the direction of travel. This can provide a more aggressive grip of the surface on which the snowmobile is traveling. This can provide advantages in acceleration and hill climbing.

It is possible to provide the track with some traction lugs that are inclined away from the direction of travel and some that are inclined toward the direction of travel. In one example, the traction lugs inclined in different directions would be arranged as alternating rows, with each row having traction lugs inclined in the same direction. In another example, traction lugs with different directions of inclination would be included in the same row.

The traction lugs can be provided at intervals across the width of the endless drive track in the usual manner. The traction lugs can be spaced in the longitudinal direction of the drive track in the usual manner. The endless drive track can be made of known elastomeric and composite materials.

Figure 10:
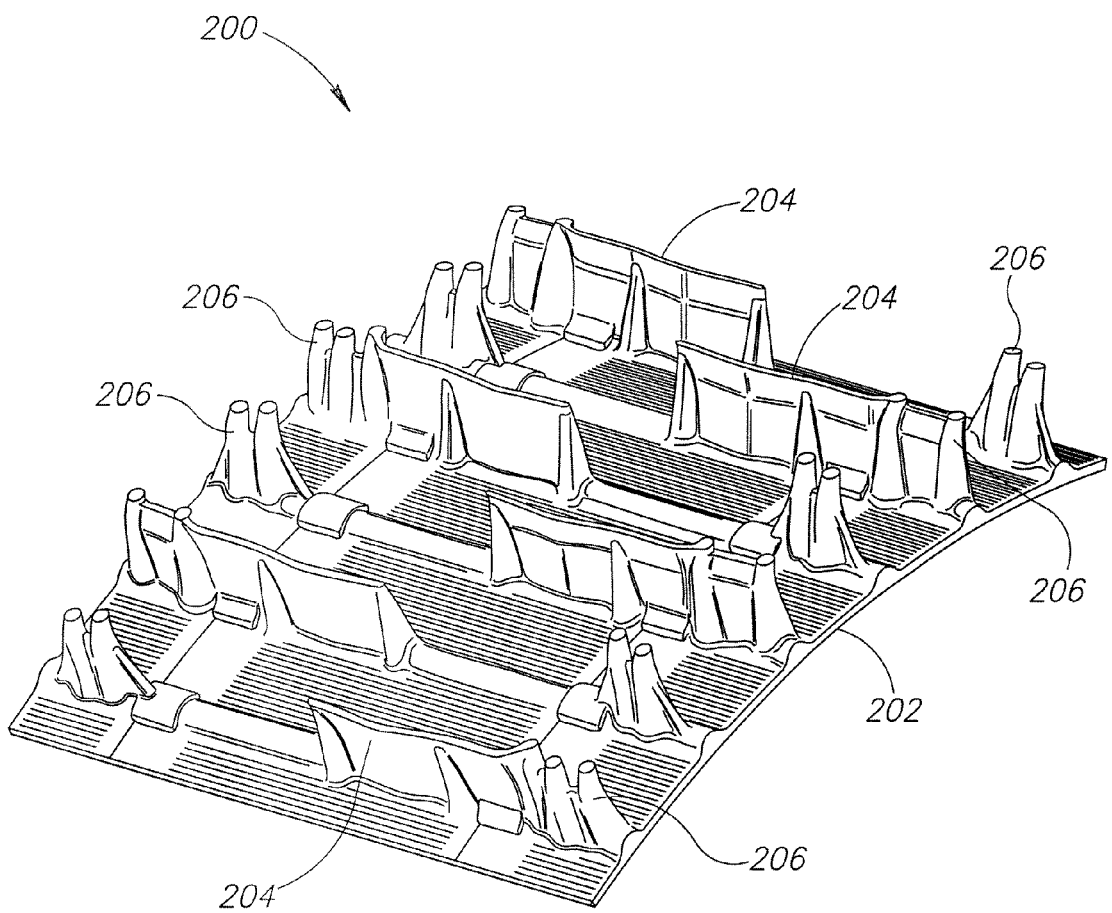
FIG. 10 is a perspective view of a portion of an endless track for a snowmobile according to an alternate embodiment of the invention.

FIG. 10 shows an endless drive track portion 200 having a track base 202, first traction members 204, and second traction towers or members 206. The base 202 and the first traction members 204 are sufficiently similar to the above-described base 14 and traction lugs 16, respectively, and thus for the purpose of brevity will not be further described herein.

Figure 11:
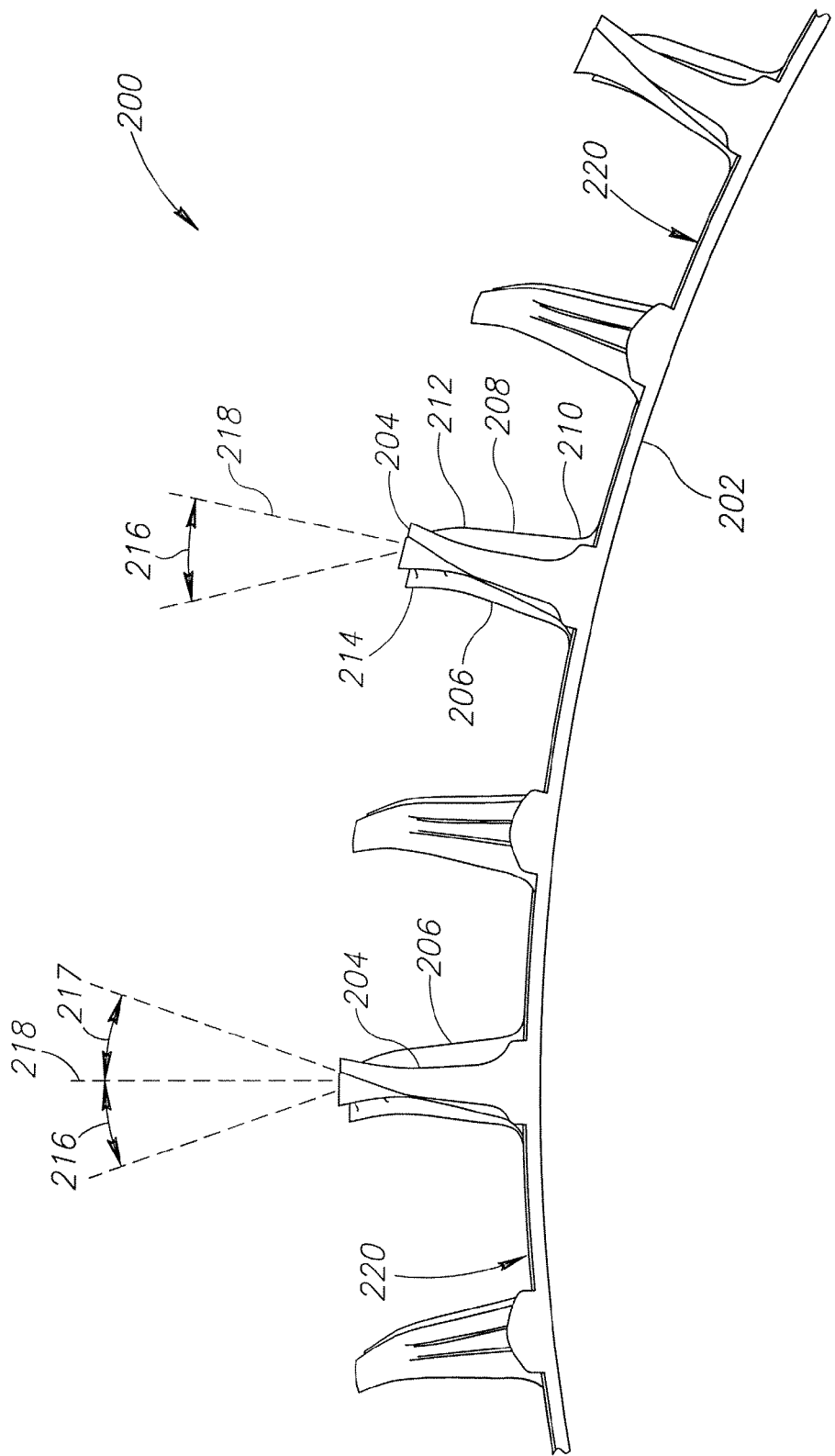
FIG. 11 is a side elevational view of a portion of an endless track for a snowmobile according to the embodiment of FIG. 10.
Figure 12:
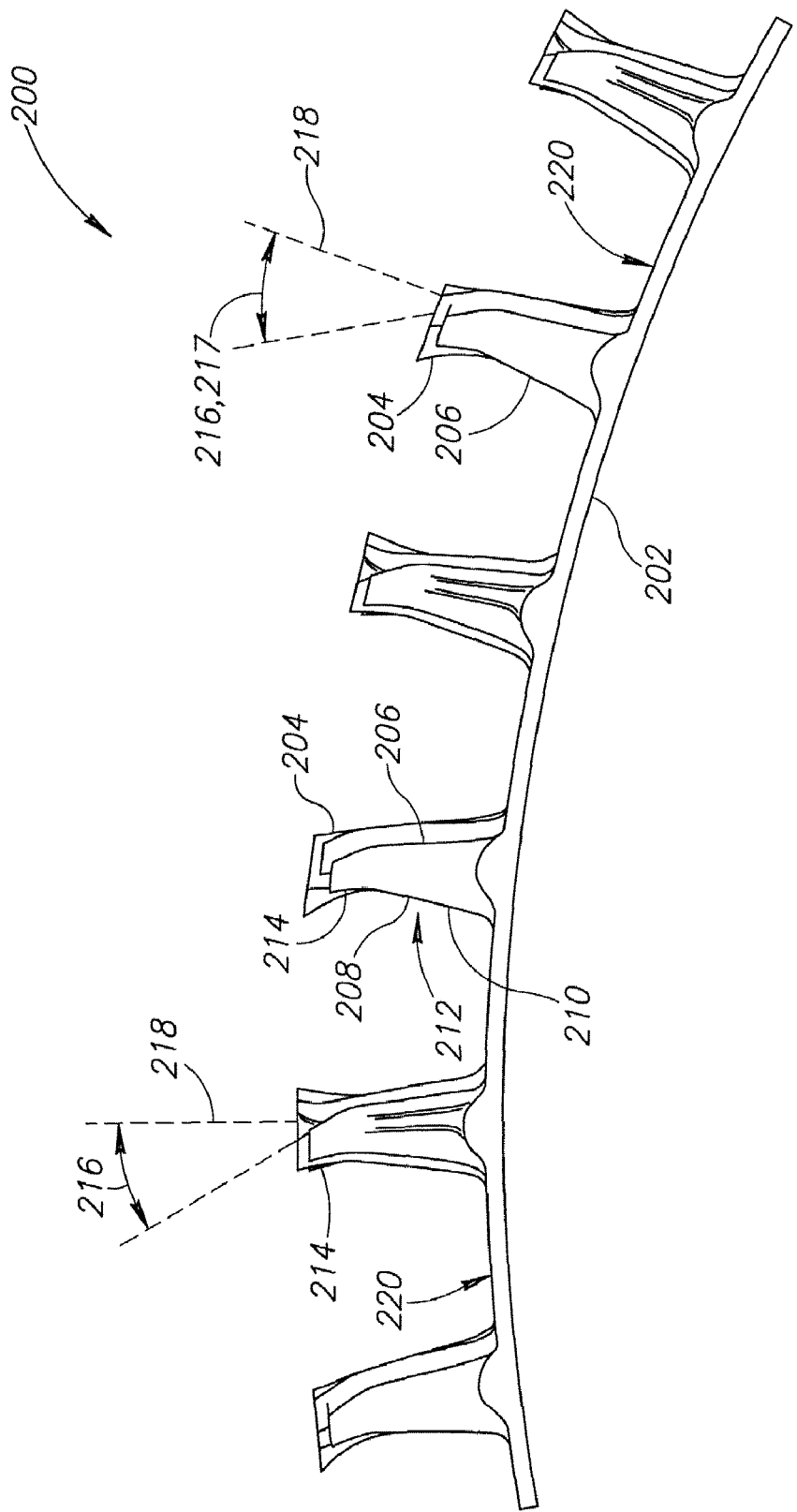
FIG. 12 is a side elevational view of a portion of an endless track for a snowmobile according to another embodiment of the invention.

FIG. 11 shows a portion of the endless track portion 200 having the track base 202, first traction members or lugs 204, and second traction towers or members 206 according to an illustrated embodiment of the invention. The second traction member 206 includes a body 208 with a first portion 210 coupled to the base 202 and a second portion 212 extending therefrom. An upper segment 214 of the second portion 212 is oriented at a second angle 216 relative to a reference line 218 extending substantially normal (i.e., geometric normal) to an exposed surface 220 of the base 202. In one embodiment, the second angle 216 forms an angle in a direction opposite to an angle 217 of the inclined first traction member 204. In another embodiment, the second angle 216 is oriented in substantially the same direction with respect to the angle 217 of at least some of the inclined first traction members 204 (FIG. 12). By way of example, FIG. 12 shows the angles 216, 217 as being approximately equal with respect to respect to reference line 218. Generally, the second angle 216 will be in a range of about 5 to 45 degrees, preferably 5 to 30 degrees, and more preferably 5 of 20 degrees. In addition, the second traction members 206 generally will have a height of about 0.5 to 3 inches (1 to 8 cm), preferably about 1.5 to 3 inches (3 to 8 cm). In one embodiment, the second traction members 206 have a height substantially equal to a height of the first traction members 204.

Figure 13:
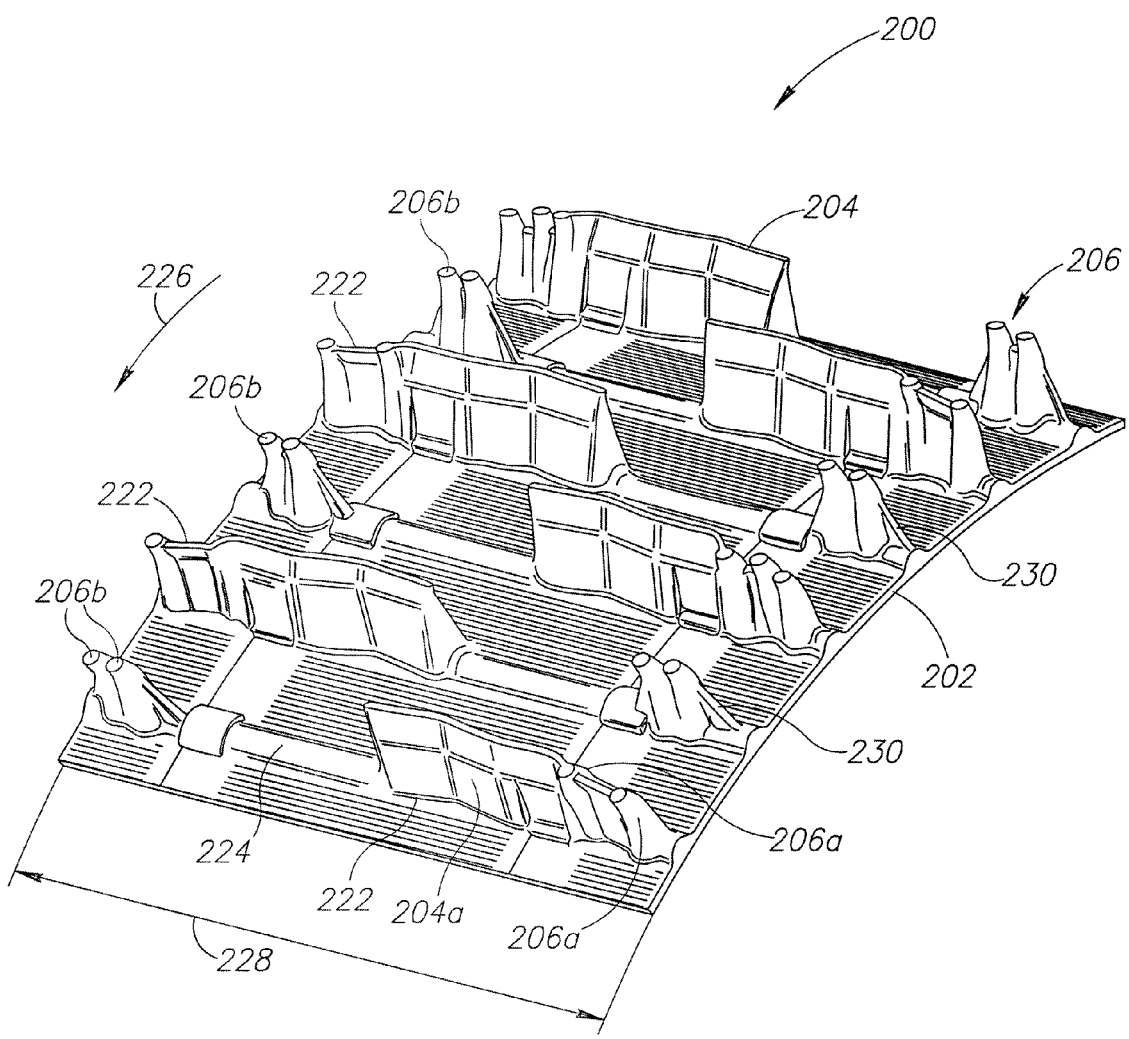
FIG. 13 is a perspective view of a portion of an endless track for a snowmobile according to another illustrated embodiment of the invention.

FIG. 13 shows the second traction members 206 with respect to the first traction members 204 when mounted, attached, or integrally formed with the base 202. On one portion of the track portion 200, the second traction member 206 is coupled to the first traction member 204 and may be integrally formed therewith. By way of example, second traction members 206a are integrally coupled with the first traction member 204a to form a unitary traction member 222. Aligned with the unitary traction member 222, but separated therefrom by an intermediate width portion 224 of the base 202 is another second traction member 206b. The second traction member 206b may be a single traction member or may be directly coupled to another second traction member 206b as illustrated. The second traction members 206b and the unitary traction members 222 may be arranged in alternating rows along a longitudinal track direction indicated by an arrow 226. It is appreciated, however, that a variety of other arrangements and configurations of the second traction members 206b and the unitary traction members 222 are contemplated and are thus not limited by the illustrated embodiment. Preferably, the second traction members 206 and the first traction members 204 are substantially, laterally aligned across a full width portion 228 of the base 202 even though the upper portions of the members 204, 206 may be oriented at different angles.

Further illustrated in FIG. 13, the second traction member 206 may include a substantially circular cross section having a diameter that is approximately equal to a thickness of the first traction member 204. In addition, a gusset 230 may be coupled to the base 202 for structurally strengthening and/or stabilizing the second traction member 206. For example, the gusset 230 provides an amount of lateral stability for the second traction member 206.

As the track drives the snowmobile forward, second traction members are curved to bite into a hard snow surface, while first traction members provide snow compression and track lift in deep powder as discussed above in connection with FIGS. 2-9. First traction members are preferably inclined away from the direction of travel of the track relative to the drive sprocket and idler wheels. Second traction members are preferably inclined toward the track direction of travel. A longer useful traction life is also obtained. Over time the traction towers tend to get folded back from the push of the drive track. The towers take a set over time. Starting with the towers angled toward the track travel direction helps provide more traction life. This is enhanced when the snowmobile is stored with a portion of the track resting on a trailer bed or other surface. Instead of accentuating the fold in a direction of track travel, the reverse, traction increasing fold is retained.

The traction towers of the second traction members 206 have these harder snow traction advantages regardless of the angle (or lack of angle) of the first traction members 204.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows:

1. An endless drive track for a snowmobile comprising:
   a base having an outer surface and a width;
   a traction lug extending integrally upward from the outer surface of the base and extending laterally across a substantial portion of the width of the base; and
   a resilient traction tower extending integrally upward from the outer surface of the base, the traction tower having a lower portion extending from the base and an upper portion extending from the lower portion, at least the upper portion being oriented at an inclined angle relative to the outer surface of the base adjacent to which the lower portion extends, wherein a leading face of the upper portion is angled in the direction of forward track movement relative to an angle normal to the outer surface of the base.

2. The endless track of claim 1, the traction lug includes an upper portion inclined relative to the outer surface of the base.

3. The endless track of claim 2, wherein the direction of inclination of the upper portion of the traction lug is opposite the angle of inclination of the upper portion of the traction tower.

4. The endless track of claim 1, wherein the traction tower extends laterally and integrally from a side of the traction lug.

5. The endless track of claim 4, further including a second traction tower laterally spaced from a side of the traction lug.

6. The endless track of claim 1, wherein the traction tower is laterally spaced from a side of the traction lug.

7. An endless drive track for a snowmobile comprising:
   a base having an outer surface and a width;
   a traction lug extending integrally upward from the outer surface of the base and extending laterally across a substantial portion of the width of the base, wherein the traction lug includes an upper portion inclined relative to the outer surface of the base; and
   a resilient traction tower extending integrally upward from the outer surface of the base, the traction tower having a lower portion extending from the base and an upper portion extending from the lower portion, at least the upper portion being oriented at an inclined angle relative to the outer surface of the base adjacent to which the lower portion extends,
   wherein the direction of inclination of the upper portion of the traction lug is opposite the angle of inclination of the upper portion of the traction tower.

* * * * *